(12) United States Patent
Nishida et al.

(10) Patent No.: US 8,657,043 B2
(45) Date of Patent: Feb. 25, 2014

(54) CRAWLER TYPE TRAVELLING DEVICE

(75) Inventors: Shin-ichiro Nishida, Sagamihara (JP); Sachiko Wakabayashi, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 885 days.

(21) Appl. No.: 12/810,509

(22) PCT Filed: Dec. 24, 2008

(86) PCT No.: PCT/JP2008/073385
§ 371 (c)(1),
(2), (4) Date: Jun. 24, 2010

(87) PCT Pub. No.: WO2009/081923
PCT Pub. Date: Jul. 2, 2009

(65) Prior Publication Data
US 2010/0282526 A1   Nov. 11, 2010

(51) Int. Cl.
*B62D 55/253* (2006.01)
(52) U.S. Cl.
CPC .................................. *B62D 55/253* (2013.01)
USPC ....................................................... 180/9.62
(58) Field of Classification Search
CPC ................................................... B62D 55/253
USPC ......... 180/9.62, 9.64; 280/5.22; 305/166, 167
See application file for complete search history.

(56) References Cited

U.S. PATENT DOCUMENTS

| | | | |
|---|---|---|---|
| 3,495,883 A | 2/1970 | Fischbach | |
| 3,498,684 A | 3/1970 | Hallaman | |
| 3,682,266 A * | 8/1972 | Stoliker | 180/9.62 |
| 3,967,721 A * | 7/1976 | Rhoden | 198/835 |
| 4,056,288 A | 11/1977 | Stedman | |
| 4,715,668 A | 12/1987 | Burmeister | |

(Continued)

FOREIGN PATENT DOCUMENTS

| | | |
|---|---|---|
| GB | 721141 | 2/1950 |
| JP | 61-500165 | 1/1986 |

(Continued)

OTHER PUBLICATIONS

First Office Action for Chinese Counterpart Patent Application No. 200880127506.1, 5 pgs., (Feb. 2, 2012).

(Continued)

*Primary Examiner* — J. Allen Shriver, II
*Assistant Examiner* — Felicia L Brittman
(74) *Attorney, Agent, or Firm* — Blakely, Sokoloff, Taylor & Zafman LLP

(57) ABSTRACT

To provide a crawler type traveling device with few rotating wheel mechanisms and equalizing the pressure contacting the ground. A crawler type traveling device comprises a driving wheel driven by a driving axis; idler wheels having axes parallel to that of the driving wheel; and a crawler belt which is spooled around the driving wheel and the idler wheels and travels around the driving wheel and the idler wheels. The crawler belt comprises an inner crawler belt having an engaging structure engaging with the driving wheel, the inner crawler belt being driven by the driving wheel; an outer crawler belt encircling circumferentially the outside of the inner crawler belt; a plurality of elastic members connecting the inner crawler belt to the outer crawler belt; and a plurality of crawler plates mounted to the outer crawler belt, and having lag for engaging with the ground.

9 Claims, 12 Drawing Sheets

(56) References Cited

U.S. PATENT DOCUMENTS

| | | | |
|---|---|---|---|
| 4,953,921 A | 9/1990 | Burns | |
| 5,894,901 A * | 4/1999 | Awamura et al. | 180/9.54 |
| 7,597,161 B2 * | 10/2009 | Brazier | 180/9.3 |
| 2005/0127752 A1 | 6/2005 | Spector et al. | |

FOREIGN PATENT DOCUMENTS

| | | |
|---|---|---|
| JP | 62-214067 | 9/1987 |
| JP | 63-501356 | 5/1988 |
| JP | 2002-006950 | 1/2002 |
| JP | 2005-503961 | 2/2005 |
| JP | 2005-111595 | 4/2005 |
| JP | 2006-218977 | 8/2006 |
| JP | 2007-238019 | 9/2007 |

OTHER PUBLICATIONS

Extended European Search Report for European Counterpart Application No. 08863612.1-1268, 8 pgs., (May 4, 2011).

PCT International Search Report for PCT Counterpart Application No. PCT/JP2008/073385 containing Communication relating to the Results of the Partial International Search Report, Jan. 27, 2009, 2 pages.

PCT Written Opinion of the International Searching Authority for PCT Counterpart Application No. PCT/JP2008/073385, Jan. 27, 2009, 3 pages.

* cited by examiner

CRAWLER TYPE TRAVELLING DEVICE

CROSS-REFERENCE TO RELATED APPLICATIONS

This patent application is a U.S. National Phase application under 35 U.S.C. §371 of International Application No. PCT/JP2008/073385, filed on Dec. 24, 2008, entitled CRAWLER TYPE TRAVEL DEVICE, which claims the priority benefit of Japanese Patent Application Number 2007-334752, filed on Dec. 26, 2007.

FIELD OF THE INVENTION

The present invention relates to a traveling device for a crawler type vehicle. More specifically, the present invention relates to a crawler type traveling device for a space robot and a space exploration vehicle, and a crawler type vehicle comprising such crawler type traveling devices.

BACKGROUND OF THE INVENTION

The ground surfaces of a moon and planets are usually not stable ground. Instead, such ground surfaces are usually covered by sand, and thus have poor bearing power. Further, when a vehicle travels on the moon and planets on which the gravity is lower than that on earth, it is necessary to distribute the weight of the vehicle over a wide area, and to lower the pressure contacting the ground when traveling.

One type of prior art space exploration vehicle has four to eight cylindrical wheels for enabling wide a ground area to be contacted. In such vehicle having wheels, the pressure contacting the ground is at a maximum under the wheels. Thus, the wheels are likely to be buried under the sand, and it would be difficult to continue traveling.

One type of combat car or construction vehicle is a crawler type vehicle which comprises a driving wheel, idler wheels and a crawler belt spooled over the driving wheel and the idler wheel, and travels on the ground using the crawler belt. The crawler type vehicle contacts a wide area of ground, and thus has a good traveling capability even on a soft ground.

The crawler type traveling device comprises a crawler belt having a plurality of crawler plates made of a rigid metal, the crawler plates being pivotally connected to adjacent plates by pins. The crawler belt goes around the driving wheel and the idler wheels. Another crawler belt is made of a rubber having flexibility, and does not have crawler plates connected by pins.

Under a vacuum or low pressure atmosphere on the moon or planets, pin portions which connect the crawler plates have poor lubricity, and thus have much friction. Thus, durability is degraded.

The crawler belt made of rubber exhausts much gas out of the belt and is easily degraded, and thus it is not suitable to use in space.

Further, a crawler type vehicle needs a lot of rotating wheel mechanisms for equalizing the pressure contacting the ground. Thus this mechanism is complicated and heavy, and reliability is degraded thereby.

Patent Document 1 (JP 2005-111595) discloses a crawler type traveling robot comprising a base, a crawler provided on each of the right and left sides of the base, and an arm provided on the base. Each crawler comprises a driving wheel provided at one end thereof in a longitudinal direction, a traveling motor for driving the driving wheel, an idling wheel provided at the other end thereof in a longitudinal direction, an endless track engaging the driving wheel and idling wheel and spooled around both wheels, a center wheel engaging the endless track at the center portion of the crawler and a central motor for driving the center wheel.

However, the crawler type traveling robot shown in patent document 1 does not contact the ground with uniform pressure. Further, there is a possibility that stones or sand will easily enter into the engaging portions of the crawler belt and the driving wheel.

Patent Document 1: JP 2005-111595

SUMMARY OF THE INVENTION

An object of the present invention is to provide a crawler belt with no movable portion connected by pins etc., and thus to provide a crawler type traveling device which has no lubricating problem.

An object of the present invention is to provide a crawler type traveling device with few rotating wheel mechanisms which equalizes the pressure thereof contacting the ground.

Another object of the present invention is to provide a crawler type traveling device in which stones or sand will not easily enter into the engaging portions of the crawler belt and the driving wheel.

A further object of the present invention is to provide a crawler type vehicle having such crawler type traveling devices.

In the present invention, a crawler belt (assembly) comprises a double crawlers configuration having an outer crawler belt and an inner crawler belt. Each of the outer and inner crawler belts is made of a thin metal plate or resin plate having a ring shape and flexibility. The outer crawler belt and the inner crawler belt are connected by elastic members. The elastic members are deformable so that the outer crawler belt and the inner crawler belt can come near to each other and far away. Thus the outer crawler is deformable according to the conditions of the ground, and thus the ground is contacted with uniform pressure.

One aspect of the present invention is a crawler type traveling device comprising:

a driving wheel driven by a driving axis;

idler wheels having axes parallel to that of the driving wheel; and a crawler belt which is spooled around the driving wheel and the idler wheels and travels around the driving wheel and the idler wheels;

wherein the crawler belt comprises:

an inner crawler belt having an engaging structure engaging with the driving wheel, the inner crawler belt being driven by the driving wheel;

an outer crawler belt encircling circumferentially the outside of the inner crawler belt;

a plurality of elastic members connecting the inner crawler belt and the outer crawler belt along the circumferential direction of the crawler belt; and a plurality of crawler plates mounted to the outer crawler belt, and having lag (lag constitution) for engaging with the ground.

The crawler belt comprises a double crawler belts configuration including an outer crawler belt and an inner crawler belt, and the inner crawler belt engages with the driving wheel. Thus, the inner crawler belt is not likely to contact the ground surface, and thus stones or sand will not easily enter into the engaging portions between the crawler belt and the driving wheel.

The crawler belt itself has flexibility in the thickness direction thereof due to the elastic members. The outer crawler belt is deformable according to the shape of the ground and stones. Thus, the ground is contacted with uniform pressure and a high driving force is obtained.

Preferably, the inner crawler belt and the outer crawler belt are each made of a thin metal plate or resin plate having a ring shape and flexibility.

The crawler belt does not have a movable portion connected by a pin etc., and thus there is no lubricating problem.

Preferably, the elastic members connecting the inner crawler belt and the outer crawler belt are made of an elastic metal plate having a curved shape.

Because the crawler belt is made of metal, there is no gas exhausted out of the belt, and thus it is suitable for use in space.

Preferably, one end of each of the elastic members may be connected to the end in the width direction of the inner crawler belt, the other end of each of the elastic members is connected to the end in the width direction of the outer crawler belt, and the intermediate portion of each of the elastic members has a concaved shape bent toward the center portion in the width direction of the crawler belt.

Thus the crawler belt having good elasticity is obtained.

Preferably, the driving wheel has protrusions at regular intervals at its center portion in the width direction thereof, the inner crawler belt has recesses which engage with the protrusions at its center portion in the width direction thereof, and the driving wheel drives the inner crawler belt.

The protrusions and the recesses comprise an engaging structure.

Preferably, the driving wheel has protrusions at regular intervals at the ends in the width direction thereof, the inner crawler belt has recesses which engage with the protrusions at the ends in the width direction thereof, and the protrusions engage the recesses, and the driving wheel drives the inner crawler belt.

The crawler belt is thus driven more reliably.

Preferably, the outer crawler belt comprises a wire crawler belt made of a plurality of metal wires extending in the circumferential direction of the outer crawler belt, and a plurality of the crawler plates are connected to the wire crawler belt at regular intervals.

The wire crawler belt is more deformable, and thus more conformable to the shape of the ground surface.

Preferably, the outer crawler belt comprises a mesh crawler belt made of a metal mesh having wires extending in the circumferential direction and in the width direction of the outer crawler belt, and a plurality of the crawler plates are connected to the wire crawler belt at regular intervals.

The mesh crawler belt has a more stable performance than the wire crawler belt.

The crawler type traveling device may further comprises a side cover covering the sides of the driving wheel, the idle wheels and the inner crawler belt, the end of the side cover extending to the portion between the inner crawler belt and the outer crawler belt.

Stone and sand are thus prohibited from entering the engaging portions of the crawler type traveling device.

The crawler type traveling device may further comprise rotating wheels having axes parallel to that of the driving wheel; and the crawler belt which is spooled around the driving wheel, the idler wheels and the rotating wheels, and travels around the driving wheel, the idler wheels and the contact wheels.

Because there are a number of the wheels engaging the crawler belt, the ground surface is contacted with a more uniform pressure.

Another aspect of the present invention is a crawler type vehicle including crawler type traveling devices, each of the crawler type traveling device comprising:

a driving wheel driven by a driving axis;

idler wheels having axes parallel to that of the driving wheel; and a crawler belt which is spooled around the driving wheel and the idler wheels and travels around the driving wheel and the idler wheels;

wherein the crawler belt comprises:

an inner crawler belt having a engaging structure engaging with the driving wheel, the inner crawler belt being driven by the driving wheel;

an outer crawler belt encircling circumferentially the outside of the inner crawler belt;

a plurality of elastic members connecting the inner crawler belt and the outer crawler belt along the circumferential direction of the crawler belt; and a plurality of crawler plates mounted to the outer crawler belt, and having lag for engaging with the ground.

In the present invention, the crawler belt comprises a double crawler belts configuration having an outer crawler belt and an inner crawler belt. The outer crawler belt contacts the ground surface, and the inner crawler belt engages to the driving wheel. Thus, the inner crawler belt is not likely to contact the ground surface, and thus stones or sand will not easily enter into the engaging portions of the inner crawler belt and the driving wheel.

The crawler belt itself has flexibility in the thickness direction thereof. Thus, the outer crawler belt is deformable according to the shape of the ground and stones. Thus, the pressure with which the ground is contacted can be low, and a high driving force is obtained. Thus, the crawler type device is not likely to be buried in the sand, and has a good traveling capability.

The crawler belt itself has flexibility due to the elastic members and pushes the outer crawler belt to the ground. Thus the number of the rotating wheels which push the crawler to the ground can be reduced. Therefore, the structure of the crawler type travelling device can be simplified, the weight can be reduced, and thus increased reliability can be obtained.

Further, the elastic members connecting the inner crawling wheel and the outer crawling wheel have a shape bending inwardly, and thus the side surface of the elastic members would not cause the ground to collapse.

Further, since the rotating wheels do not easily contact the ground or stones, the diameter of the rib of the rotating wheels for preventing the crawler belt from deviating is not limited to a small diameter.

According to the present invention, a crawler belt with no movable portions connected by pins etc. is provided, and thus a crawler type traveling device having no lubricating problem is provided.

A crawler type traveling device is provided having a small number of rotary mechanisms, and the ground is contacted with uniform pressure.

Further, a crawler type vehicle is provided having such crawler type traveling devices.

BRIEF DESCRIPTION OF THE DRAWINGS

FIG. 4 (B) is a cross sectional view along A-A line of FIG. 4 (A).

FIG. 8 (B) is a schematic cross sectional view of the second embodiment.

DETAILED DESCRIPTION

Figure 1:
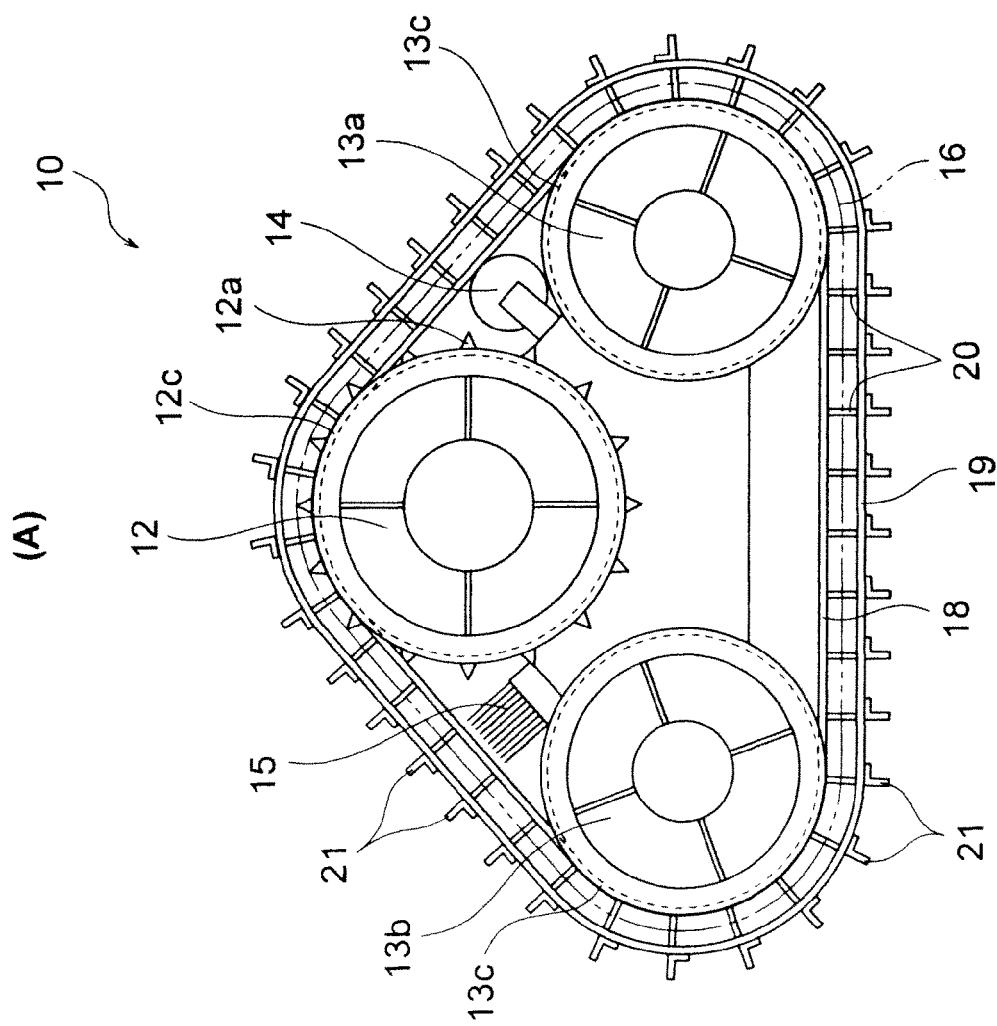
FIG. 1 (A) shows a schematic side view of a crawler unit 10 of a crawler type traveling device according to the first embodiment of the present invention (the cover is shown in dashed lines), and FIG. 1 (B) shows a front view thereof.

Now, embodiments of the present invention will be described. The embodiments relate to a crawler type traveling device for a space robot and a space exploration vehicle. However, the present invention is not limited to the crawler type vehicle for use in space. That is, the present invention can be used for crawler type vehicles for various household applications.

FIG. 1(A) shows a schematic side view of a crawler unit 10 of a crawler type traveling device according to a first embodiment of the present invention, and FIG. 1(B) shows a front view thereof. In the description of the present invention, one crawler unit 10 is referred to as a crawler type traveling device.

The crawler unit 10 (crawler type traveling device) comprises a rotating driving axis 11 connected to an actuator (a driving source, not shown) such as a motor, and a cylindrical sprocket (a driving wheel) 12. Protrusions 12a are provided for engaging to a crawler wheel around the sprocket 12. Ribs which have a large diameter (flange) 12c are provided at the ends in the width direction of the sprocket 12 for holding the crawler belt.

In the prior art crawler mechanism, if the diameter of the ribs is too large, the ribs protrude out of the crawler belt, and thus the ribs are likely to contact the ground directly. Thus, the diameter of the ribs can not be too large. The crawler belt of the present invention has double crawler belts and is thick, and thus the diameter of the ribs can be large.

The crawler unit 10 also comprises a front idler wheel 13a which has a cylindrical shape and a rear idler wheel 13b which has a cylindrical shape.

The axis of the front idler wheel 13a and the axis of the rear idler wheel 13b are parallel to the axis of the sprocket 12. Ribs 13c which have a large diameter are provided at the ends in the width direction of the idler wheels 13a, 13b for holding the crawler belt.

The crawler unit 10 comprises a holding member 17 for holding each member of the crawler unit 10, the holding member 17 being the main structure of the crawler unit 10. The sprocket 12, the front idler wheel 13a, the rear idler wheel 13b and other members are mounted to the holding member 17.

A crawler belt is spooled around the sprocket 12, the front idler wheel 13a and the rear idler wheel 13b. The crawler belt includes an inner crawler belt 18 for engaging the sprocket 12, the front idler wheel 13a and the rear idler wheel 13b. The inner crawler belt 18 is made of a metal plate or a resin plate having a thin ring shape (short cylindrical shape), and is flexible, and thus can go around the sprocket 12 and the idler wheels 13a,b by following the outer shapes of the sprocket 12 and the idler wheels 13a,b. The inner crawler belt 18 has holes for engaging the protrusions 12a of the sprocket 12. The protrusions 12a of the sprocket 12 engage the holes of the inner crawler belt 18 to drive the inner crawler belt 18.

The crawler unit 10 comprises an outer crawler belt 19 encircling circumferentially the inner crawler belt 18. The outer crawler belt 19 is made of a metal plate or a resin plate having a thin ring shape, and is flexible. The outer crawler belt 19 has a wider width than that of the inner crawler belt 18. Alternatively, the outer crawler belt 19 may have substantially the same width as that of the inner crawler belt 18.

The inner crawler belt 18 is connected to the outer crawler belt 19 by elastic members 20. One end of each of the elastic members 20 is connected to an end in the width direction of the inner crawler belt 18, and the other end of each of the elastic members 20 is connected to an end in the width direction of the outer crawler belt 19. Each of the intermediate portions of the elastic members 20 is bent toward the center portion in the width direction of the crawler belt. The elastic members 20 are made of elastic metal, and thus are easily deformable in the thickness direction of the crawler belt.

The crawler belt is integrally comprised of the inner crawler belt 18, the outer crawler belt 19 and the elastic members 20. The crawler belt has flexibility, and can go around the sprocket 12 and the idler wheels 13a, 13b.

Figure 4:
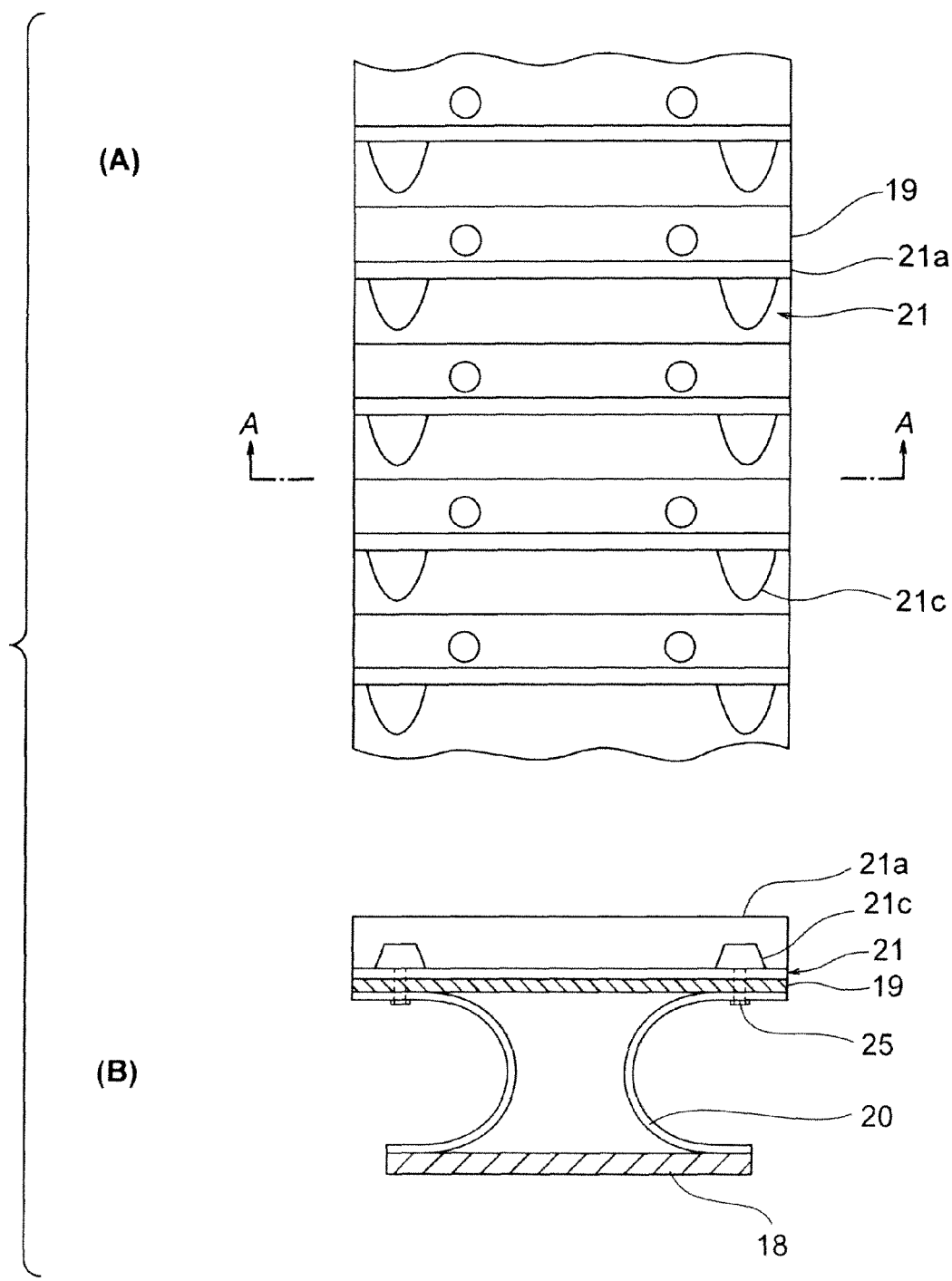
FIG. 4 (A) is a schematic plane view of a portion of the crawler belt.

Crawler plates 21 are provided around the outer crawler belt 19. The structures of the crawler plates 21 will be explained later referring to FIGS. 4 and 5.

Further, the crawler unit 10 comprises a tensioner 14. The tensioner 14 presses the inner crawler belt 18 from the inside so that the inner crawler belt 18 will not bend inwardly.

Further, the crawler unit 10 comprises a brush 15. The brush 15 engages the inner crawler belt 18 from the inside to brush out the stones and sand adhered to the inner crawler belt 18.

Figure 8:
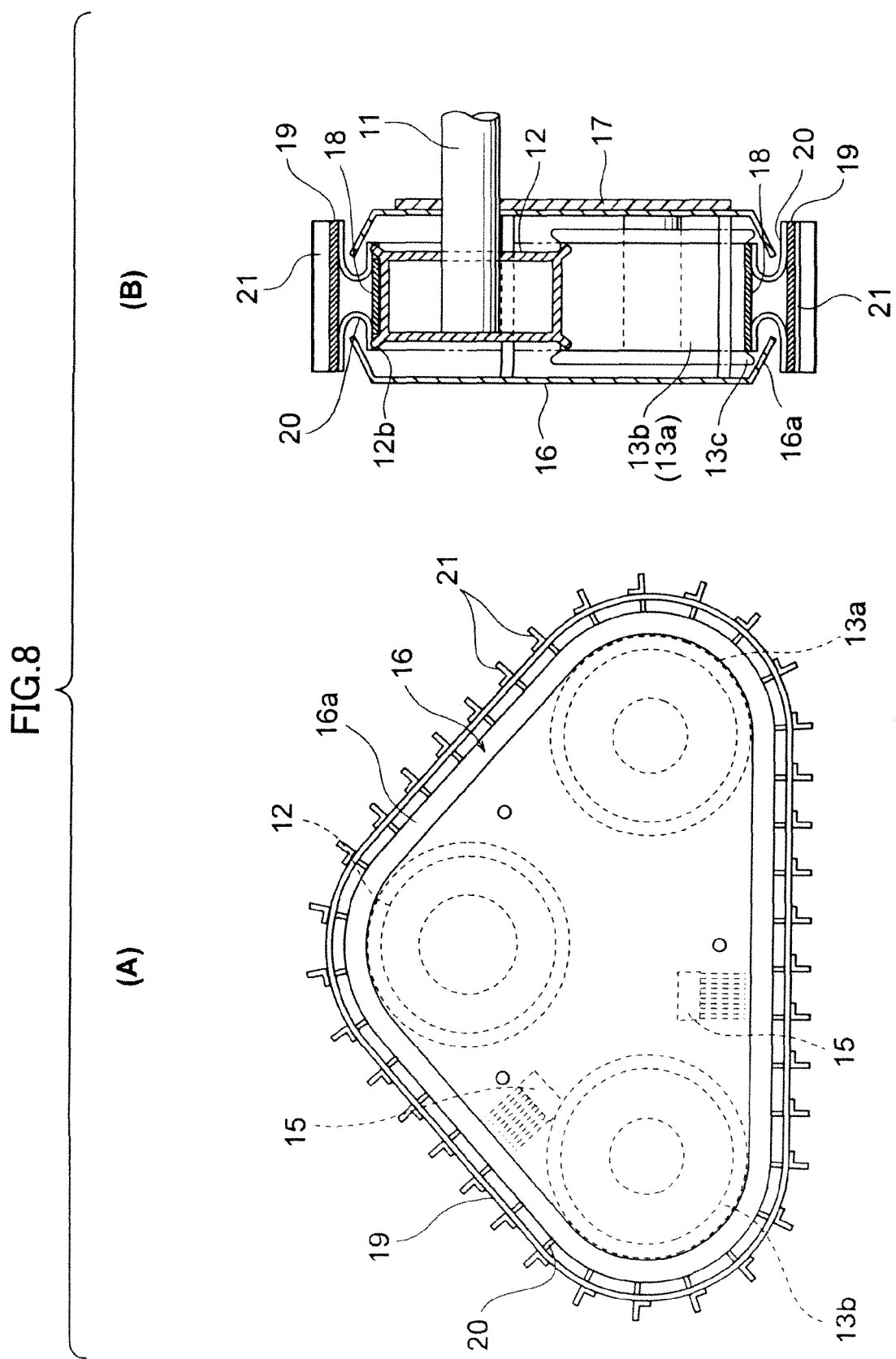
FIG. 8 (A) is a schematic side view showing the side cover.

Further, the crawler unit 10 comprises a side cover 16. (In FIG. 1(A), the side cover 16 is shown in dashed lines so that inner members can be seen.) The side cover 16 covers the sides of the sprocket 12, the front idle wheel 13a, the rear idle wheel 13b and the inner crawler belt 18 to preventing stones and sand entering into the engaging portions of the inner crawler belt and the sprocket. The shape of the side cover 16 will be explained referring to FIG. 8 later.

Figure 2:
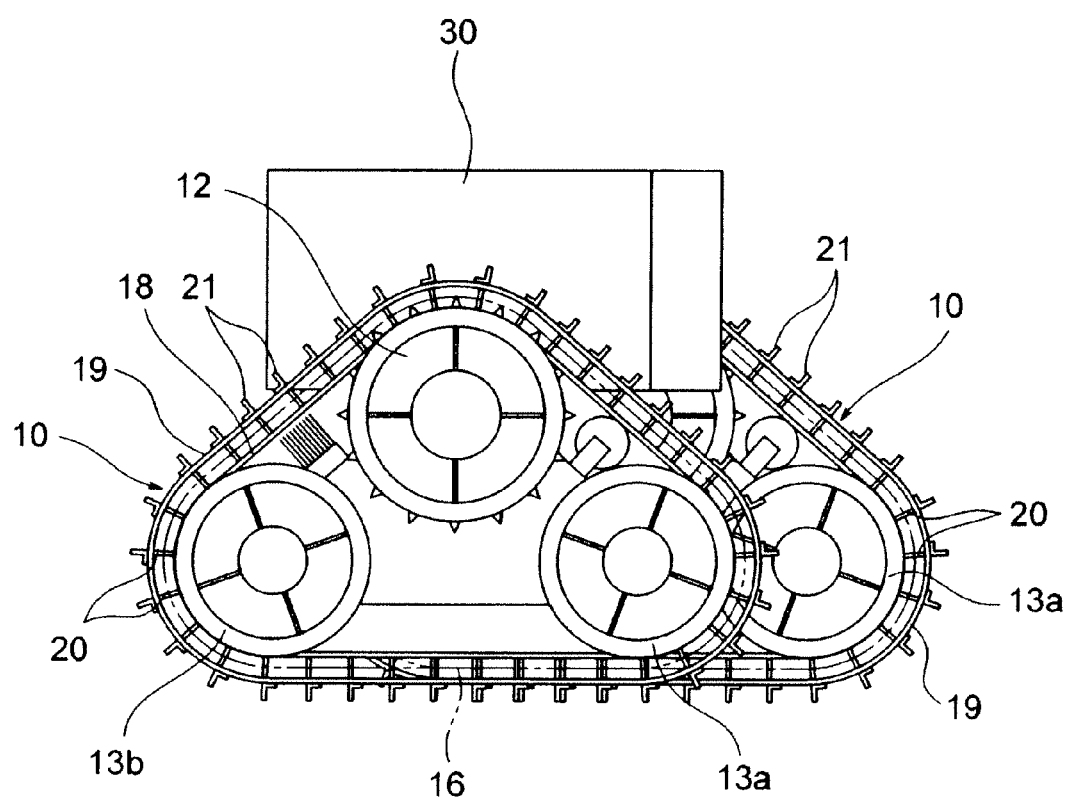
FIG. 2 is a schematic view of a crawler type vehicle having a pair of the crawler units at right and left sides of the body of the vehicle.

FIG. 2 is a schematic view of a crawler type vehicle having a pair of the crawler units 10 at the right and left sides of the car body 30.

Figure 3:
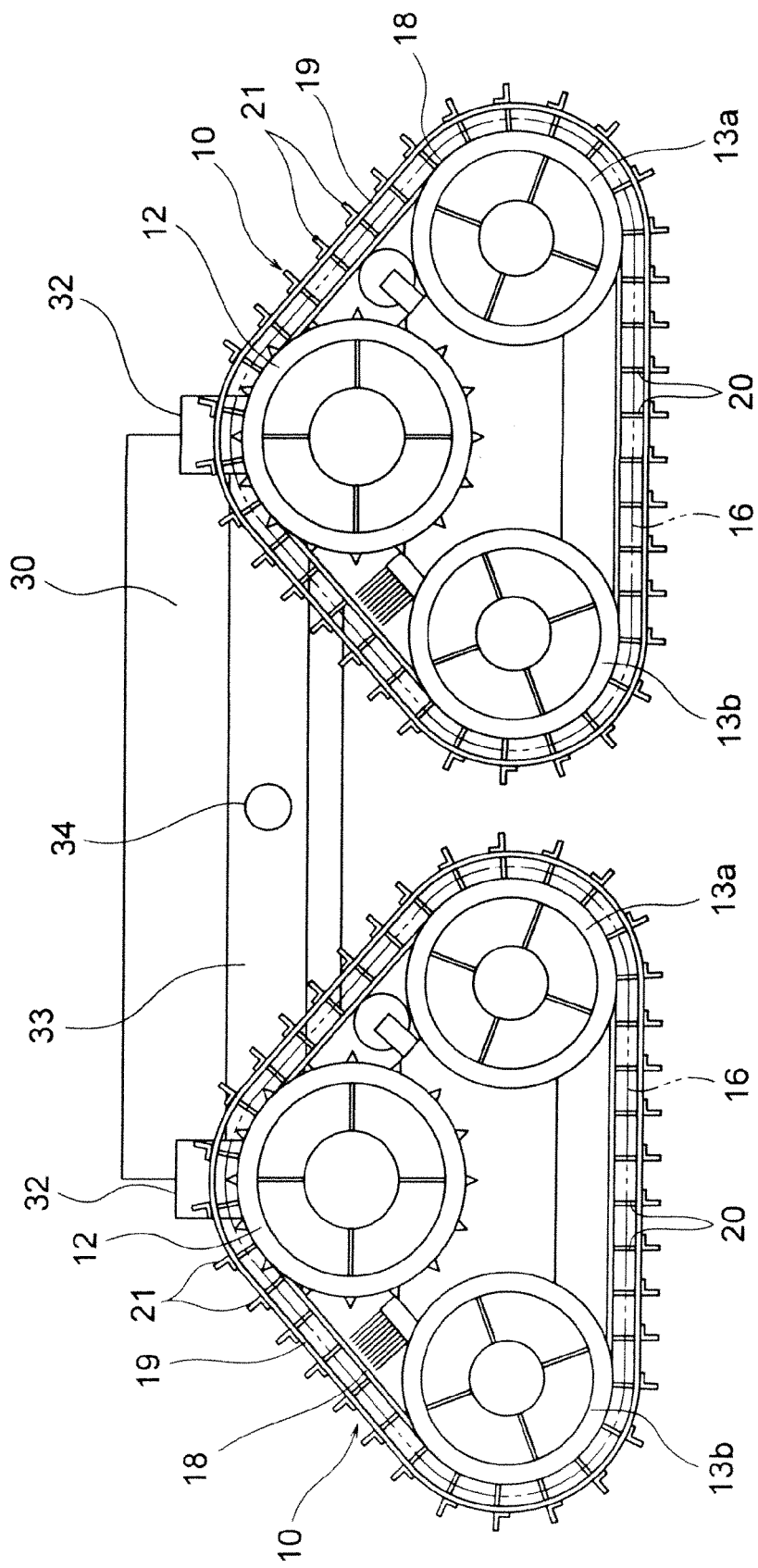
FIG. 3 is a schematic side view of a crawler type vehicle having a pair of the crawler units connected to the steering mechanism at the front portion of the car body and a pair of the crawler units at the rear portion of the car body.

FIG. 3 is a schematic side view of a crawler type vehicle having a pair of the crawler units 10 connected to a steering mechanism at a front portion of the car body 30 and a pair of the crawler units 10 at a rear portion of the car body 30. A pivot hinge 34 is provided at the center portion in the longitudinal direction of the car body 30, the pivot hinge 34 extending in the transverse direction of the car body 30. Pivot beams 33 are mounted to the pivot hinge 34, the pivot beams 33 being substantially parallel to the sides of the car body 30. The pivot beams 33 can be pivoted around the pivot hinge 34. While the crawler type vehicle is traveling, when the front crawler unit 10 has a height different from that of the rear front crawler unit 10, the crawler type vehicle can follow the shape of the ground.

Steering mechanisms 32 are provided at both ends of each of two pivot beams 33. The steering mechanism 32 can rotate the crawler unit 10 around the axis in the vertical direction to turn the crawler unit 10. Instead, the steering mechanism 32 can be provided at only one end of each of the two pivot beams 33.

FIG. 4(A) shows a schematic plane view of a portion of the crawler belt, and FIG. 4(B) is a cross sectional view along A-A line of FIG. 4(A).

The outer crawler belt 19 encircles the inner crawler belt 18 which has a short cylindrical shape. The inner crawler belt 18 is connected to the outer crawler belt 19 by a plurality of the elastic members 20. All around the inner crawler belt 18, the elastic members 20 are provided at regular intervals in the longitudinal direction of the inner crawler belt 18. Each of the elastic members 20 connects one end in the width direction of the inner crawler belt 18 to one end in the width direction of the outer crawler belt 19. Each of the intermediate portions of the elastic members 20 between the inner crawler belt 18 and the outer crawler belt 19 is bent toward the center portion in the width direction of the crawler belt. That is, the elastic members 20 has a curved shape.

The elastic members 20 are made of metal such as a stainless steel having a thin thickness, and thus can be easily deformable. Thus the interval between the inner crawler belt 18 and the outer crawler belt 19 can be easily changed according to the shape of the ground, the outer crawler belt 19 following the shape of the ground.

The elastic members 20 may have other shapes than that shown here so long as they are easily deformable. For example, each of the elastic members 20 may not be parallel to the width direction of the inner crawler belt 18, but instead may be oblique to the width direction of the inner crawler belt 18.

Crawler plates 21 are provided around the outer crawler belt 19 at regular intervals in the circumferential direction. The crawler plates 21 are made of a rigid metal. The crawler plates 21 engage the ground to obtain driving strength.

The elastic members 20, the outer crawler belt 19 and the crawler plates 21 are connected to each other by bolts 25. Each of the crawler plates 21 is mounted to the outer crawler belt 19, the crawler plates 21 not being connected to each other by pins.

Figure 5:
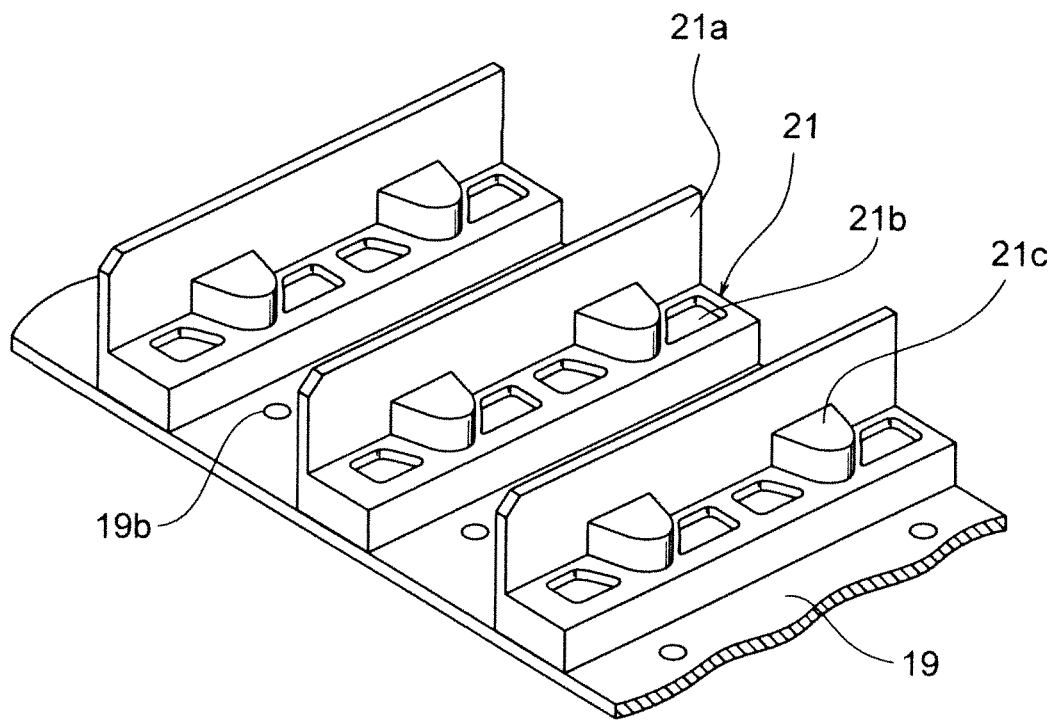
FIG. 5 is a perspective view of the crawler plates provided around the outer crawler belt.

FIG. 5 is a perspective view of the crawler plates 21 provided around the outer crawler belt 19. The crawler plates 21 have substantially the same width as that of the outer crawler belt 19. Lags 21a extend in the vertical direction from one end of each of the base portions of the crawler plates 21 which are adjacent to the outer crawler belt 19. The lags 21a have substantially the same width as that of the crawler plates 21. The lags 21a have substantially the same height. The lags 21a are for definitely engaging the crawler plates 21 with the ground, and thus the shape of the lags 21a is not limited as long as the lags 21a engage with the ground.

The crawler plates 21 have recesses 21b at their respective base portions. The recesses 21b are for preventing the crawler plates 21 from slipping. The recesses 21b may have any shape as long as the crawler plates 21 are prevented from slipping. The recesses 21b are optional.

The crawler plates 21 have protrusions 21c. The protrusions 21c prevent the crawler plates 21 from slipping. The protrusions 21c have female screws (not shown) on their respective undersides so that the crawler plates 21 can be connected to the outer crawler belt 19 by the bolts 25. The protrusions 21c are optional.

The outer crawler belt 19 may have sand holes 19b.

Figure 6:
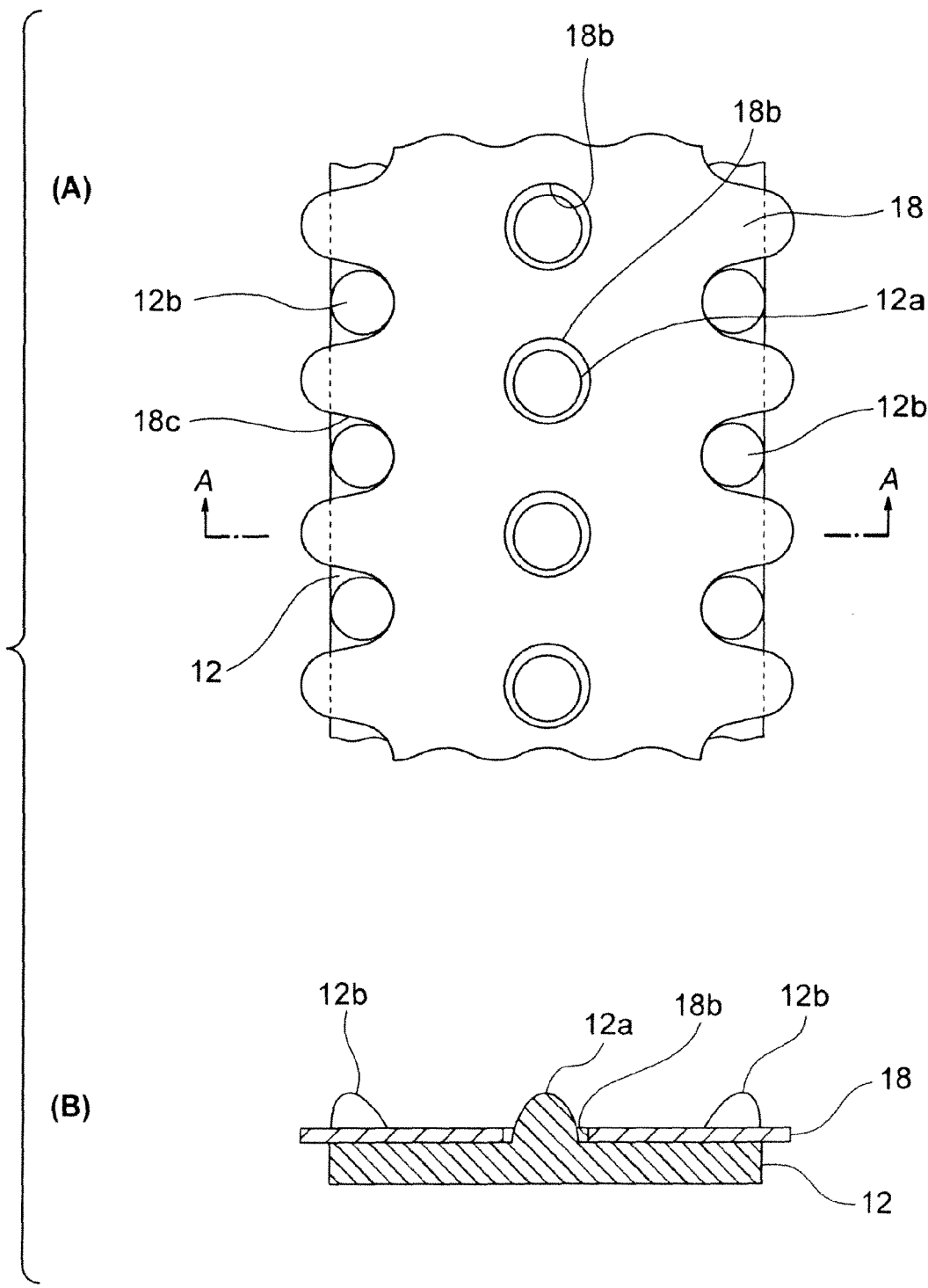
FIG. 6 (A) is a plane view showing the engagement between the sprocket and the inner crawler belt of the second embodiment, and FIG. 6 (B) is a cross sectional view along A-A line of (A).

FIG. 6(A) is a plane view showing the engagement (engaging structure) between the sprocket 12 and the inner crawler belt 18 of a second embodiment of the present invention, and FIG. 6(B) is a cross sectional view along A-A line of FIG. 6(A). FIG. 6(A)(B) is for showing the engagement between the sprocket 12 and the inner crawler belt 18, and thus the members such as the outer crawler belt 19 and the elastic members 20 are not shown. In the second embodiment, the inner crawler belt 18 engages the sprocket 12 not only at the center portion in the width direction of the inner crawler belt 18, but also at both ends of the inner crawler belt 18.

The sprocket 12 has protrusions 12a at regular intervals at the center portion in the width direction of the inner crawler belt 18. The inner crawler belt 18 has holes 18b for inserting the protrusions 12a of the sprocket 12 at the same intervals as those for the protrusions 12a. The protrusions 12a of the sprocket 12 engage with the holes 18b of the inner crawler belt 18 to drive the inner crawler belt 18.

In the second embodiment, the sprocket 12 does not have the ribs 12c of the same height, but instead has protrusions 12b at regular intervals at both ends in the width direction around the sprocket 12. The inner crawler belt 18 has recesses 18c for inserting the protrusions 12b of the sprocket 12 at the same intervals as those for the protrusions 12b. The protrusions 12a of the sprocket 12 engage the holes 18c of the inner crawler belt 18 to drive the inner crawler belt 18. The protrusions 12b of the sprocket 12 also hold the inner crawler belt 18 so that the inner crawler belt 18 will not deviate from the sprocket 12.

Figure 7:
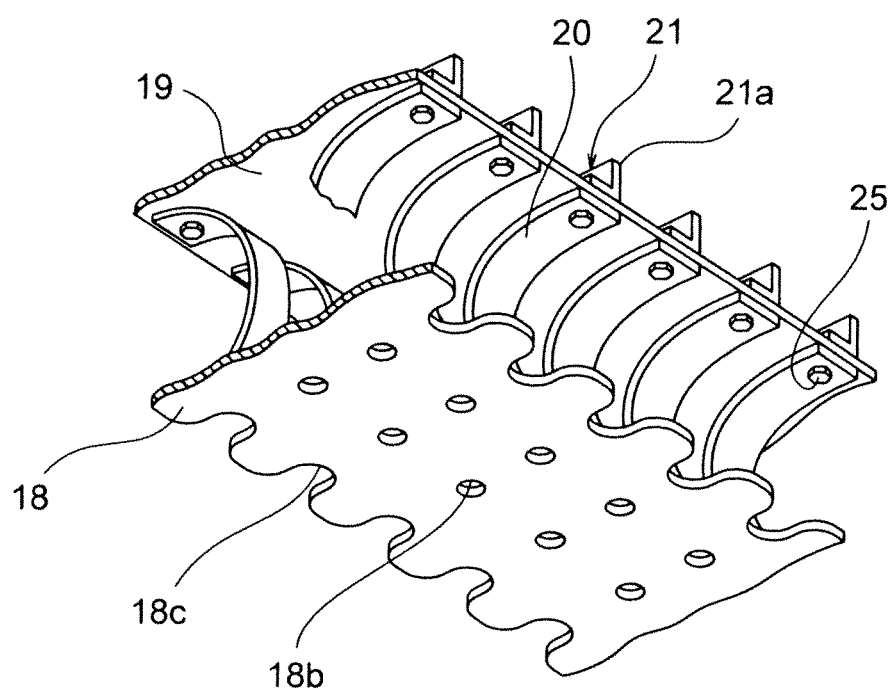
FIG. 7 is a perspective view showing a portion of the crawler belt of the second embodiment.

FIG. 7 is a perspective view showing a portion of the crawler belt of a second embodiment. The inner crawler belt 18 has recesses 18c at both ends in the width direction of the inner crawler belt 18. In FIG. 7, the inner crawler belt 18 has two rows of holes 18b. The elastic members 20 are connected to the outer crawler belt 19 by bolts 25.

FIG. 8(A) is a side view of the crawler unit of the second embodiment showing that the side cover 16 covers the ends of the sprocket 12 and the idler wheels 13a,13b, and FIG. 8(B) is a schematic cross sectional view. A brush 15 is shown in FIG. 8(A). The first embodiment has the same side cover 16 as that in the second embodiment. The side cover 16 is mounted to the holding member 17, and covers the ends of the sprocket 12 and the idler wheels 13a,13b. The end 16a of the side cover 16 extends to the recessed portions of the elastic members 20 between the inner crawler belt 18 and the outer crawler belt 19. This structure prevent stones and sand from entering into the engaging portions of the inner crawler belt 18 and the sprocket 12.

As shown in the schematic cross sectional view of FIG. 8(B), the protrusions 12b of the sprocket 12 engage the recesses of the inner crawler belt 18. The idler wheels 13a,b have ribs 13c at both ends in the width direction of the idler wheels. The ribs 13c hold both ends of the inner crawler belt 18 so that the inner crawler belt 18 will not deviate from the idler wheels 13a,b.

Figure 9:
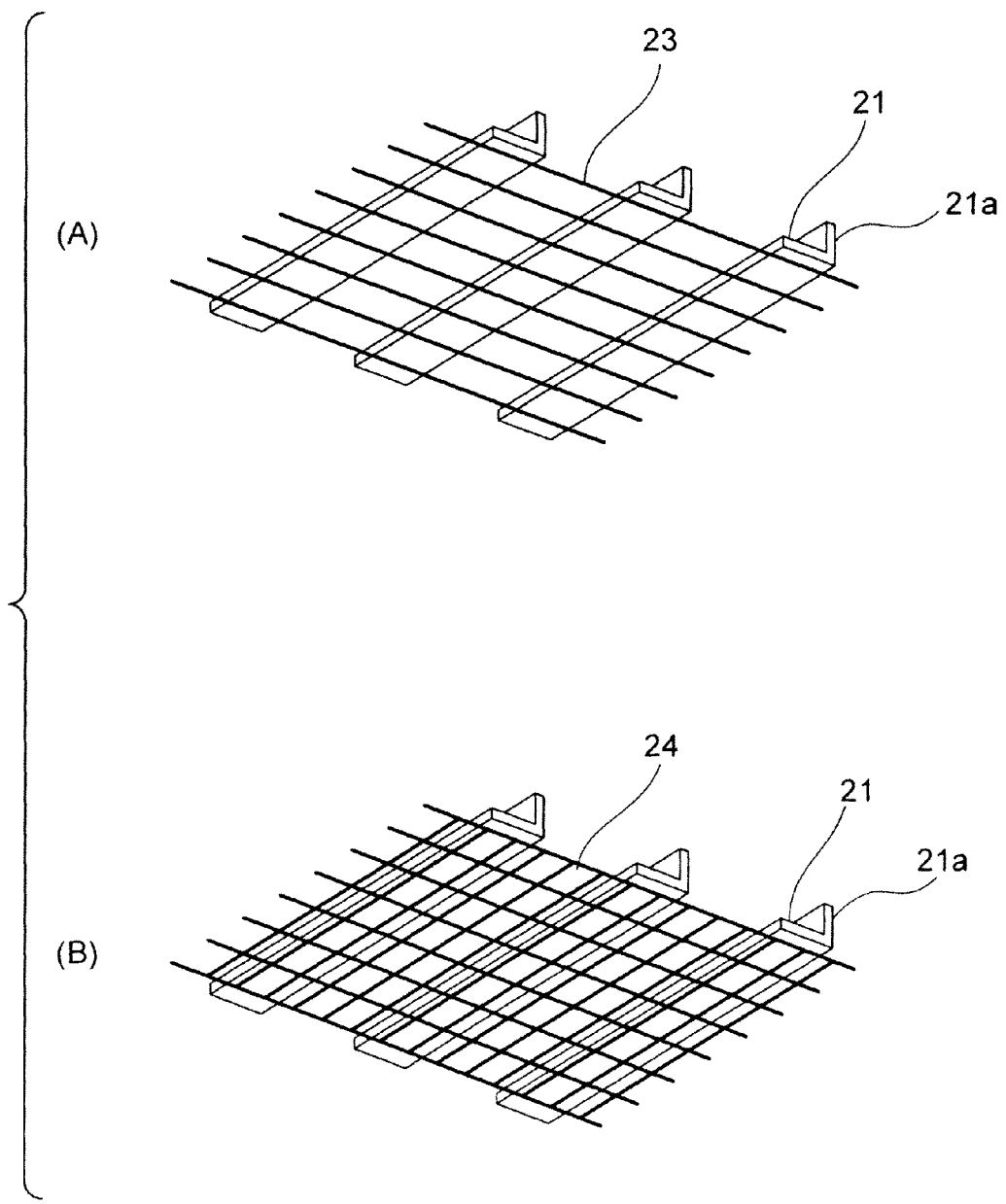
FIG. 9 (A) is a schematic perspective view showing a portion of the wire crawler belt (the outer crawler belt) of the third embodiment, and FIG. 9 (B) is a schematic perspective view of a portion of the mesh crawler belt.

FIG. 9(A) is a schematic perspective view of a portion of the crawler unit of a third embodiment showing a wire crawler belt 23 which is the outer crawler belt. The outer crawler belt has a plurality of wires parallel to the longitudinal direction of the outer crawler belt. Crawler plates 21 are mounted to the wire crawler belt 23 at regular intervals.

The wire crawler belt 23 is more deformable than the outer crawler belt 19 of the embodiment shown in FIG. 1, and thus more conformable to the shape of the ground surface.

FIG. 9(B) is a schematic perspective view showing a portion of a mesh crawler belt 24.
The mesh crawler belt 24, in addition to the wires shown in FIG. 9(A), has wires orthogonal to the wires shown in FIG. 9(A). The mesh crawler belt 24 has wires in the longitudinal direction and width direction thereof, and thus a stable performance is obtained.

Figure 10:
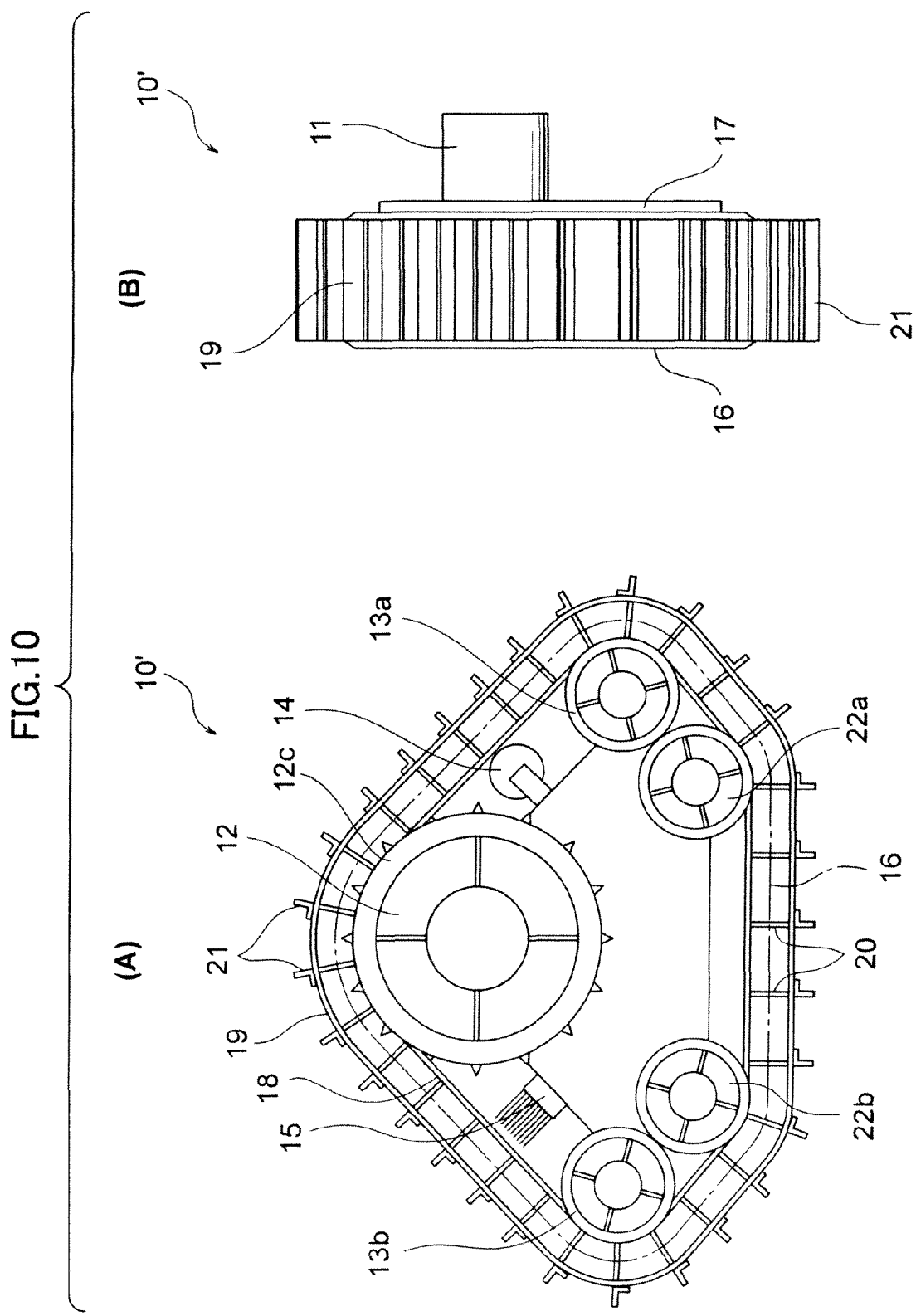
FIG. 10 (A) is a schematic side view showing a crawler unit of the fourth embodiment of the present invention, and FIG. 10 (B) is a front view.

FIG. 10(A) is a schematic side view of a fourth embodiment of the present invention showing a crawler unit 10', and FIG. 10(B) is a front view thereof. The crawler unit 10' is different from the crawler unit 10 of the first embodiment shown in FIG. 1 in that the crawler unit 10' has rotating wheels 22a, 22b in addition to the idler wheels 13a, 13b. The other members of the crawler unit 10' are the same as those of the crawler unit 10 shown in FIG. 1. That is, the ribs 12c which have the same height are provided at the ends in the width direction of the sprocket 12. Because the crawler unit 10' has a lot of wheels which engage the crawler belt, the ground is contacted with more uniform pressure.

EXAMPLES

Figure 11:
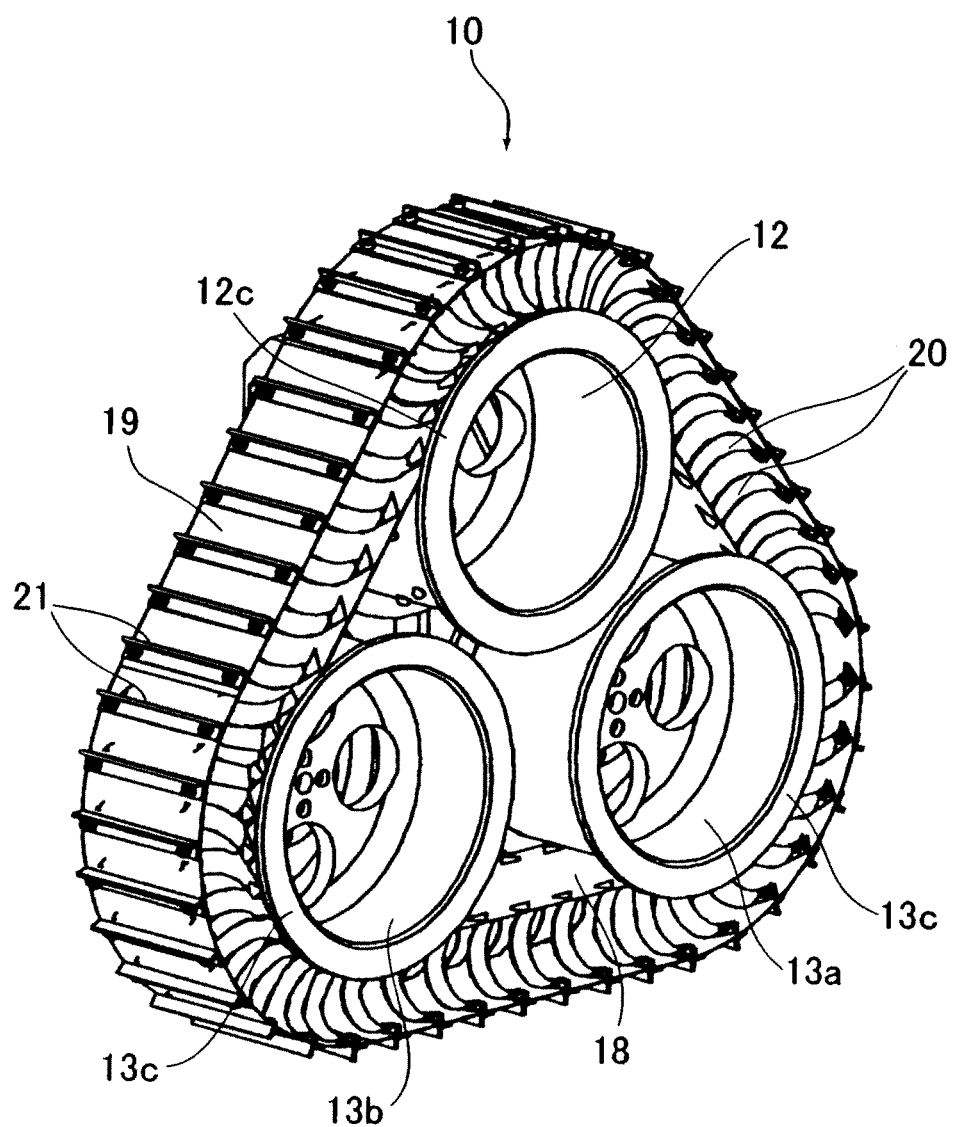
FIG. 11 is a perspective view of the example of the crawler unit of the first embodiment shown in FIG. 1.

FIG. 11 is a perspective view of an example of the crawler unit 10 of the first embodiment shown in FIG. 1. The ribs 12c which have the same height are provided at the ends in the width direction around the sprocket 12. There are no protrusions 12b of the second embodiment shown in FIG. 6. The cover 16 is not provided in this example.

Figure 12:
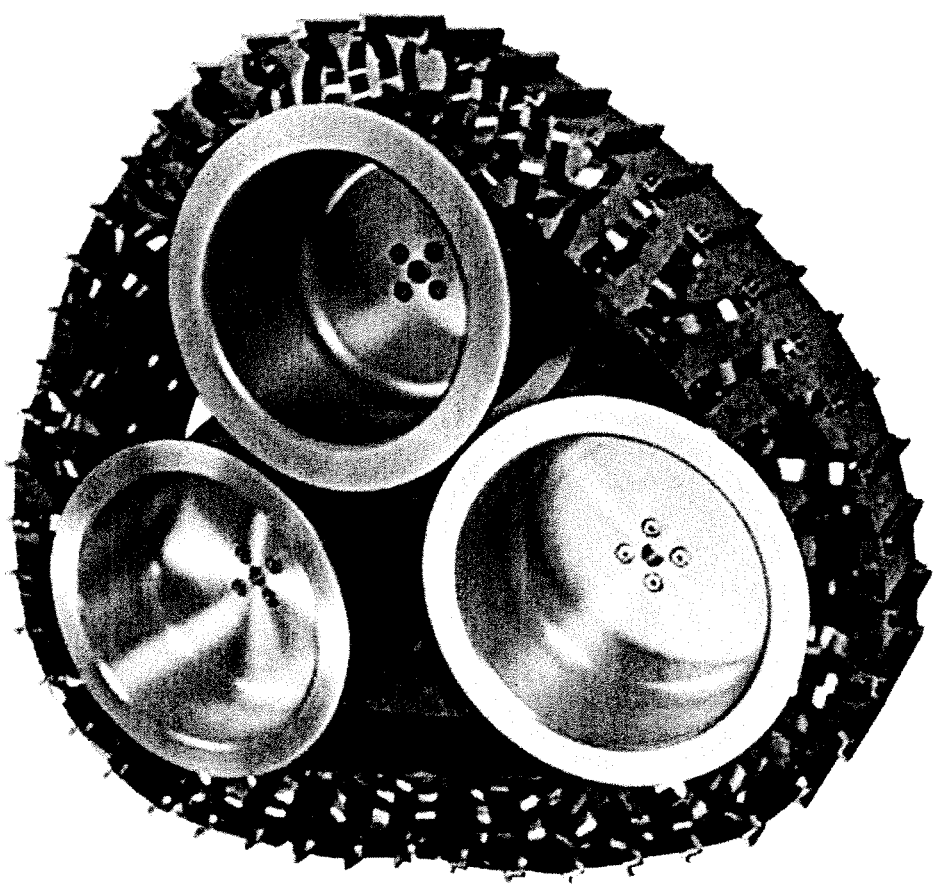
FIG. 12 is a photograph of the example of the crawler unit of the first embodiment shown in FIG. 1.

FIG. 12 is a photograph of an example of the crawler unit 10 of the first embodiment shown in FIG. 1. This example has the sprocket and the idler wheels made of aluminum alloy (a diameter of about 140 mm and thickness of about 3 mm), the inner crawler belt 18 and the outer crawler belt 19 made of stainless steel (a thickness of 0.2 mm and width of 65 mm), the elastic members 20 made of stainless steel (a thickness of 0.2 mm and width of 10 mm) and the crawler plates made of aluminum alloy (10×10×1.5 mm aluminum angle bar). The example shown in FIG. 12 has the elastic members 20 which are not orthogonal to the direction of the crawler belt but instead oblique to it.

INDUSTRIAL APPLICABILITY

The crawler type vehicle having the crawler type traveling devices of the present invention contacts the ground with a uniform pressure, and has a simple structure suitable for use in space. The present invention can also be used as a crawler type vehicle for households.

EXPLANATION OF REFERENCE NUMERALS 10 crawler unit
11 rotating driving axis
12 sprocket (driving wheel)
12a, b protrusion
12c rib
13a front idler wheel
13b rear idler wheel
13c rib
14 tensioner
15 brush
16 side cover
17 holding member
18 inner crawler belt
18b hole
18c recess
19 outer crawler belt
19b sand hole
20 elastic member
21 crawler plate
21a lag
21b recess
21c protrusion
22 rotating wheel
23 wire crawler belt
24 mesh crawler belt
25 bolt
30 car body
31 traveling device
32 steering mechanism
33 pivot beams
34 pivot hinge
35 car body

What is claimed is:

1. A crawler type traveling device comprising:
a driving wheel driven by a driving axis;
idler wheels having axes parallel to that of the driving wheel; and
a crawler belt which is spooled around the driving wheel and the idler wheels and travels around the driving wheel and the idler wheels;
wherein the crawler belt comprises:
an inner crawler belt having an engaging structure engaging with the driving wheel, the inner crawler belt being driven by the driving wheel;
an outer crawler belt encircling circumferentially the outside of the inner crawler belt;
a plurality of elastic members connecting the inner crawler belt and the outer crawler belt along the circumferential direction of the crawler belt; and
a plurality of crawler plates mounted to the outer crawler belt, and having a projecting portion for engaging with the ground,
wherein each of the inner crawler belt and the outer crawler belt is a single member made of a thin metal plate or resin plate having a ring shape and flexibility, and
wherein the elastic members connecting the inner crawler belt and the outer crawler belt are made of a thin metal plate or resin plate which is elastic and has a curved shape.

2. The crawler type traveling device according to claim 1, wherein one end of each of the elastic members is connected to the end in the width direction of the inner crawler belt, the other end of each of the elastic members is connected to the end in the width direction of the outer crawler belt, and the intermediate portion of each of the elastic members has a concaved shape bent toward the center portion in the width direction of the crawler belt.

3. The crawler type traveling device according to claim 1, wherein the driving wheel has protrusions at regular intervals at the center portion in its width direction thereof, the inner crawler belt has recesses which engage with the protrusions at its center portion in the width direction thereof, and the driving wheel drives the inner crawler belt.

4. The crawler type traveling device according to claim 3, wherein the driving wheel has protrusions at regular intervals at the ends in the width direction thereof, the inner crawler belt has recesses which engage with the protrusions at the ends in the width direction thereof, and the driving wheel drives the inner crawler belt.

5. The crawler type traveling device according to claim 1, wherein the outer crawler belt comprises a wire crawler belt made of a plurality of metal wires extending in the circumferential direction of the outer crawler belt, and a plurality of the crawler plates are connected to the wire crawler belt at regular intervals.

6. The crawler type traveling device according to claim 1, wherein the outer crawler belt comprises a mesh crawler belt made of a metal mesh having wires extending in the circumferential direction and in the width direction of the outer crawler belt, and a plurality of the crawler plates are connected to the wire crawler belt at regular intervals.

7. The crawler type traveling device according to claim 1, further comprising a side cover covering the sides of the driving wheel, the idle wheels and the inner crawler belt, the end of the side cover extending to the portion between the inner crawler belt and the outer crawler belt.

8. The crawler type traveling device according to claim 1, further comprising rotating wheels having axes parallel to that of the driving wheel; and the crawler belt which is spooled around the driving wheel, the idler wheels and the rotating wheels, and travels around the driving wheel, the idler wheels and the rotating wheels.

9. A crawler type vehicle including crawler type traveling devices, each of the crawler type traveling devices comprising:
- a driving wheel driven by a driving axis;
- idler wheels having axes parallel to that of the driving wheel; and
- a crawler belt which is spooled around the driving wheel and the idler wheels and travels around the driving wheel and the idler wheels;

wherein the crawler belt comprises:
- an inner crawler belt having an engaging structure engaging with the driving wheel, the inner crawler belt being driven by the driving wheel;
- an outer crawler belt encircling circumferentially the outside of the inner crawler belt;
- a plurality of elastic members connecting the inner crawler belt and the outer crawler belt along the circumferential direction of the crawler belt; and
- a plurality of crawler plates mounted to the outer crawler belt, and having a projecting portion for engaging with the ground, wherein each of the inner crawler belt and the outer crawler belt is a single member made of a thin metal plate or resin plate having a ring shape and flexibility, and the elastic members connecting the inner crawler belt and the outer crawler belt are made of a thin metal plate or resin plate which is elastic and has a curved shape.

\* \* \* \* \*